(12) United States Patent
Pierce et al.

(10) Patent No.: US 11,008,468 B2
(45) Date of Patent: May 18, 2021

(54) TEMPORARY DECORATIVE AUTOMOTIVE/PROTECTIVE PAINT BASED ON POLYURETHANE DISPERSIONS

(71) Applicant: Covestro LLC, Pittsburgh, PA (US)

(72) Inventors: Joseph Pierce, Pittsburgh, PA (US); Andrew Bradburn, Carnegie, PA (US); Daniel W. Dezort, Glenshaw, PA (US); Andrew Birnie, Sewickley, PA (US)

(73) Assignee: Covestro LLC, Pittsburgh, PA (US)

( * ) Notice: Subject to any disclaimer, the term of this patent is extended or adjusted under 35 U.S.C. 154(b) by 0 days.

(21) Appl. No.: 15/948,281

(22) Filed: Apr. 9, 2018

(65) Prior Publication Data

US 2019/0225814 A1    Jul. 25, 2019

Related U.S. Application Data

(63) Continuation-in-part of application No. 15/879,625, filed on Jan. 25, 2018, now abandoned.

(51) Int. Cl.

| | |
|---|---|
| *C09D 5/20* | (2006.01) |
| *C09D 5/00* | (2006.01) |
| *C09D 5/32* | (2006.01) |
| *C09D 7/40* | (2018.01) |
| *C09D 175/04* | (2006.01) |
| *B05D 7/14* | (2006.01) |
| *C09D 7/65* | (2018.01) |
| *C09D 175/08* | (2006.01) |
| *C08G 77/14* | (2006.01) |
| *C09D 175/06* | (2006.01) |
| *C08G 18/44* | (2006.01) |
| *C08G 18/42* | (2006.01) |
| *C08G 18/08* | (2006.01) |
| *C08G 18/48* | (2006.01) |
| *C08G 77/46* | (2006.01) |
| *C09D 7/61* | (2018.01) |
| *B05D 1/02* | (2006.01) |
| *C08K 7/18* | (2006.01) |
| *C08K 3/36* | (2006.01) |
| *C08K 3/04* | (2006.01) |
| *C08K 3/013* | (2018.01) |
| *B05D 1/32* | (2006.01) |

(52) U.S. Cl.
CPC ............. *C09D 5/008* (2013.01); *B05D 7/14* (2013.01); *C08G 18/0819* (2013.01); *C08G 18/42* (2013.01); *C08G 18/44* (2013.01); *C08G 18/48* (2013.01); *C08G 77/14* (2013.01); *C08G 77/46* (2013.01); *C09D 5/20* (2013.01); *C09D 5/32* (2013.01); *C09D 7/40* (2018.01); *C09D 7/61* (2018.01); *C09D 7/65* (2018.01); *C09D 7/67* (2018.01); *C09D 7/69* (2018.01); *C09D 175/04* (2013.01); *C09D 175/06* (2013.01); *C09D 175/08* (2013.01); *B05D 1/02* (2013.01); *B05D 1/325* (2013.01); *C08K 3/013* (2018.01); *C08K 3/04* (2013.01); *C08K 3/36* (2013.01); *C08K 7/18* (2013.01); *C08K 2201/011* (2013.01)

(58) Field of Classification Search
CPC . C09D 3/008; C09D 7/65; C09D 7/69; C09D 7/61; C09D 7/67; C09D 7/40; C09D 5/20; C09D 5/32; C09D 175/04; C09D 175/06; C09D 175/08; C09D 5/008; B05D 7/14; B05D 1/02; B05D 1/325; C08G 18/0819; C08G 18/42; C08G 18/44; C08G 18/48; C08G 77/14; C08G 77/46; C08G 18/283; C08K 3/013; C08K 3/04; C08K 3/36; C08K 7/18; C08K 2201/011
USPC ......................................................... 523/218
See application file for complete search history.

(56) References Cited

U.S. PATENT DOCUMENTS

| | | |
|---|---|---|
| 6,482,885 B1 | 11/2002 | Muller et al. |
| 6,831,126 B2 | 12/2004 | Gertzmann et al. |
| 9,273,214 B1 | 3/2016 | Figliozzi |
| 2001/0029279 A1 | 10/2001 | Muller et al. |
| 2003/0094592 A1 | 5/2003 | Gertzmann et al. |
| 2007/0167565 A1 | 7/2007 | Rische et al. |
| 2019/0225818 A1* | 7/2019 | Pierce ................ C08G 18/0819 |

FOREIGN PATENT DOCUMENTS

| | | |
|---|---|---|
| CN | 105331263 A | 2/2016 |
| CN | 106811081 A | 6/2017 |
| CN | 106893471 A | 6/2017 |
| CN | 106893474 A | 6/2017 |
| DE | 202009008396 U1 | 8/2009 |
| EP | 1213308 A1 | 6/2002 |

* cited by examiner

*Primary Examiner* — Hannah J Pak
(74) *Attorney, Agent, or Firm* — John E. Mrozinski, Jr.

(57) ABSTRACT

The present invention provides a homogeneous, sprayable liquid composition formulated for spraying onto a substrate to protectively cover at least a portion of a surface of the substrate, the sprayable liquid composition comprising: (a) an aqueous polyurethane dispersion (PUD); (b) a pigment; (c) a surfactant; and (d) a silica compound, the sprayable liquid composition, once dry, forming a solid, uniform, peelable coating adhered to the substrate without use of a separate adhesive coating layer, the peelable coating having a greater scratch resistance, and the peelable coating having a greater fuel staining resistance compared to peelable, specialty rubber coatings. The peelable coating may also find use in or as automotive OEM delivery wraps, transportation coatings, ride-hailing advertisements; agricultural and mining equipment; in architectural coatings such as floor coatings, bath tub and shower protective peelable coatings; and in home and office furniture protective coverings.

10 Claims, No Drawings

TEMPORARY DECORATIVE AUTOMOTIVE/PROTECTIVE PAINT BASED ON POLYURETHANE DISPERSIONS

CROSS-REFERENCE TO RELATED APPLICATIONS

This application is a continuation-in-part patent application and claims the benefit of U.S. Ser. No. 15/879,625 filed on Jan. 25, 2018, the entire contents of which are incorporated herein by reference.

FIELD OF THE INVENTION

The present invention relates in general to, coatings and more specifically to, low volatile organic compound (VOC), peelable temporary coatings made without the inclusion of exempt solvents that resist fuel staining, resist scratching and may be applied and cured in a shorter time than coating made with exempt solvents.

BACKGROUND OF THE INVENTION

Peelable temporary coatings permit vehicle owners to change the appearance of their vehicles while also protecting it from day-to-day wear and tear without permanently altering the OEM-applied finish. Although currently available temporary coatings excel at providing a new look for vehicles, these coatings lack resistance to fuel staining, can scratch easily and may take an extended time to apply. Because current temporary coatings are based on styrene-butadiene rubber, which must be heavily solvated to reduce the viscosity to levels acceptable for spraying, these coatings have a high level of volatile organic compounds (VOC), thus limiting where they may be sold and used. Another drawback to the current peelable, high VOC coatings is the low solids levels which can require the application of numerous coats to achieve targeted film build.

To reduce or eliminate these problems, therefore, a need exists in the art for peelable temporary coating for vehicles and other substrates made without exempt solvents, that has a low VOC, resists fuel staining, resists scratching and may be applied and cured in a shorter time to achieve targeted film build.

SUMMARY OF THE INVENTION

Accordingly, the present invention reduces or eliminates problems inherent in the art by providing a homogeneous, sprayable liquid composition formulated for spraying onto a substrate to protectively cover at least a portion of a surface of the substrate, the sprayable liquid composition comprising: (a) an aqueous polyurethane dispersion (PUD); (b) a surfactant; (c) optionally, a pigment; and (d) optionally, a silica compound, the sprayable liquid composition, once dry, forming a solid, uniform, peelable coating adhered to the substrate without use of a separate adhesive coating layer, the peelable coating having a greater scratch resistance, and the peelable coating having a greater fuel staining resistance compared to peelable, specialty rubber coatings.

The uniform, peelable coating of the invention requires fewer coats to achieve required film build than current peelable coatings because it has a higher solids content.

Although primarily intended for use in or as peelable coatings for vehicles, the inventive compositions may also find use in or as automotive OEM delivery wraps, transportation coatings, ride-hailing advertisements; agricultural and mining equipment; in architectural coatings such as floor coatings, bath tub and shower protective peelable coatings; and in home and office furniture protective coverings.

These and other advantages and benefits of the present invention will be apparent from the Detailed Description of the Invention herein below.

DETAILED DESCRIPTION OF THE INVENTION

The present invention will now be described for purposes of illustration and not limitation. Except in the operating examples, or where otherwise indicated, all numbers expressing quantities, percentages, and so forth in the specification are to be understood as being modified in all instances by the term "about."

Any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112(a), and 35 U.S.C. § 132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference herein.

Reference throughout this specification to "various non-limiting embodiments," "certain embodiments," or the like, means that a particular feature or characteristic may be included in an embodiment. Thus, use of the phrase "in various non-limiting embodiments," "in certain embodiments," or the like, in this specification does not necessarily refer to a common embodiment, and may refer to different embodiments. Further, the particular features or characteristics may be combined in any suitable manner in one or more embodiments. Thus, the particular features or characteristics illustrated or described in connection with various or certain embodiments may be combined, in whole or in part, with the features or characteristics of one or more other embodiments without limitation. Such modifications and variations are intended to be included within the scope of the present specification.

The grammatical articles "a", "an", and "the", as used herein, are intended to include "at least one" or "one or more", unless otherwise indicated, even if "at least one" or "one or more" is expressly used in certain instances. Thus, these articles are used in this specification to refer to one or more than one (i.e., to "at least one") of the grammatical objects of the article. By way of example, and without limitation, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

In various embodiments, the present invention provides a homogeneous, sprayable liquid composition formulated for spraying onto a substrate to protectively cover at least a portion of a surface of the substrate, the sprayable liquid composition comprising (a) an aqueous polyurethane dispersion (PUD); (b) optionally, a pigment; (c) a surfactant; and (d) optionally, a silica compound, the sprayable liquid composition, once dry, forming a solid, uniform, peelable coating adhered to the substrate without use of a separate adhesive coating layer, the peelable coating having a greater scratch resistance, and the peelable coating having a greater fuel staining resistance compared to peelable, specialty rubber coatings.

As used herein, the term "polymer" encompasses prepolymers, oligomers and both homopolymers and copolymers; the prefix "poly" in this context referring to two or more. As used herein, the term "molecular weight", when used in reference to a polymer, refers to the number average molecular weight, unless otherwise specified.

"Cured," "cured composition" or "cured compound" refers to components and mixtures obtained from reactive curable original compound(s) or mixture(s) thereof which have undergone a chemical and/or physical changes such that the original compound(s) or mixture(s) is(are) transformed into a solid, substantially non-flowing material. A typical curing process may involve crosslinking.

The term "curable" means that an original compound(s) or composition material(s) can be transformed into a solid, substantially non-flowing material by means of chemical reaction, crosslinking, radiation crosslinking, or the like. Thus, compositions of the invention are curable, but unless otherwise specified, the original compound(s) or composition material(s) is(are) not cured.

As used herein, the term "polyol" refers to compounds comprising at least two free hydroxy groups. Polyols include polymers comprising pendant and terminal hydroxy groups.

The term "coating composition" refers to a mixture of chemical components that will cure and form a coating when applied to a substrate.

As used herein, the term "substrate" is not particularly limited and includes any substrate that is desired to be protected with a peelable coating. The substrate exemplified in the examples is an exterior surface of a vehicle. Other suitable substrates include, but are not limited to architecture and furniture.

The term "vehicle" means automobiles, vans, trucks, motorcycles, buses, heavy trucks, trailers, road paving machinery, tractors, bulldozers, cranes, combines, graders, locomotives, rail cars, snow mobiles, all-terrain vehicles, wagons, buggies, bicycles, watercraft, and aircraft.

The sprayable compositions of the invention may be applied under a variety of ambient environmental conditions, including relatively low (near 32° F. (0° C.)) or relatively high temperatures (near 70° F. (21.1° C.)), as well as temperatures in between. Additionally, the inventive compositions may be applied under variable humidity. It is understood that the specified temperature ranges are exemplary; the liquid compositions of the present invention may be applied at lower or higher temperatures.

As used herein, the term "dispersion" refers to a composition comprising a discontinuous phase distributed throughout a continuous phase. For example, "waterborne dispersion" and "aqueous dispersion" refer to compositions comprising particles or solutes distributed throughout liquid water. Waterborne dispersions and aqueous dispersions may also include one or more co-solvents in addition to the particles or solutes and water. As used herein, the term "dispersion" includes, for example, colloids, emulsions, suspensions, sols, solutions (i.e., molecular or ionic dispersions), and the like.

As used herein, the term "aqueous polyurethane dispersion" means a dispersion of polyurethane particles in a continuous phase comprising water. As used herein, the term "polyurethane" refers to any polymer or oligomer comprising urethane (i.e., carbamate) groups, urea groups, or both. Thus, the term "polyurethane" as used herein refers collectively to polyurethanes, polyureas, and polymers containing both urethane and urea groups, unless otherwise indicated.

In certain embodiments, the aqueous polyurethane dispersion (PUD) that is included in the liquid compositions of present invention comprises one or more polyurethanes that are the reaction product of reactants comprising, consisting essentially of, or, in some cases, consisting of: a polyisocyanate; a polymeric polyol having a number average molecular weight ("$M_n$") of 400 to 8,000 g/mol; and a compound comprising at least one isocyanate-reactive group and an anionic group or potentially anionic group.

The liquid compositions of the present invention include an aqueous polyurethane dispersion (PUD) comprising the reaction product of: (i) a polyisocyanate; (ii) a polymeric polyol having a number average molecular weight of 400 to 8000 g/mol; (iii) a compound comprising at least one isocyanate-reactive group and an anionic group or potentially anionic group; (iv) water, (v) a mono functional polyalkylene ether; (vi) a polyol having a molecular weight of less than <400 g/mol, and (vii) a polyamine or amino alcohol having a molecular weight of 32 to 400 g/mol.

Suitable polyisocyanates (i) include, but are not limited to, aromatic, araliphatic, aliphatic and cycloaliphatic polyisocyanates, such as, for example, 1,4-butylene diisocyanate, 1,6-hexamethylene diisocyanate (HDI), pentamethylene diisocyanate (PDI), isophorone diisocyanate (IPDI), 2,2,4- and 2,4,4-trimethyl-hexamethylene diisocyanate, the isomeric bis-(4,4'-isocyanatocyclohexyl)methanes or mixtures thereof of any desired isomer content, 1,4-cyclohexylene diisocyanate, 1,4-phenylene diisocyanate, 2,4- and/or 2,6-toluene diisocyanate or hydrogenated 2,4- and/or 2,6-toluene diisocyanate, 1,5-naphthalene diisocyanate, 2,4'- and 4,4'-diphenylmethane diisocyanate, 1,3- and 1,4-bis-(2-isocyanato-prop-2-yl)-benzene (TMXDI), 1,3-bis(isocyanatomethyl)benzene (XDI), (S)-alkyl 2,6-diisocyanato-hexanoates or (L)-alkyl 2,6-diisocyanatohexanoates.

Polyisocyanates having a functionality >2 can also be used if desired. Such polyisocyanates include modified diisocyanates having a uretdione, isocyanurate, urethane, allophanate, biuret, iminooxadiazine-dione and/or oxadiazinetrione structure, as well as unmodified polyisocyanates having more than 2 NCO groups per molecule, for example 4-isocyanatomethyl-1,8-octane diisocyanate (nonane triisocyanate) or triphenylmethane-4,4',4"-tri isocyanate.

In some embodiments of the present invention, polyisocyanates or polyisocyanate mixtures containing only aliphatically and/or cycloaliphatically bonded isocyanate groups are used that have a mean functionality of from 2 to 4, such as 2 to 2.6 or 2 to 2.4.

Polymeric polyols (ii) have a molecular weight $M_n$ of from 400 to 8000 g/mol, such as 400 to 6000 g/mol or, in some cases, 500 to 3000 g/mol, 1000 to 3000 g/mol or 1500 to 3000 g/mol. In certain embodiments, these polymeric polyols have a hydroxyl number of from 20 to 400 mg KOH/g of substance, such as 20 to 300 mg KOH/g of substance, 20 to 200 mg KOH/g of substance or 20 to 100 mg KOH/g of substance. In certain embodiments, these polymeric polyols have a hydroxyl functionality of 1.5 to 6, such as 1.8 to 3 or 1.9 to 2.1. As will be appreciated, the $M_n$ of a polymer containing functional groups, such as a polyol, can, as discussed earlier, be calculated from the functional group number, such as hydroxyl number, which is determined by end-group analysis. "Hydroxyl number", as used herein, is determined according to DIN 53240.

Exemplary polymeric polyols (ii) include, for example, polyester polyols, polyacrylate polyols, polyurethane polyols, polycarbonate polyols, polyether polyols, polyester polyacrylate polyols, polyurethane polyacrylate polyols, polyurethane polyester polyols, polyurethane polyether polyols, polyurethane polycarbonate polyols, polyester polycarbonate polyols, phenol/formaldehyde resins, on their own or in mixtures.

Suitable polyether polyols include, for example, the poly-addition products of the styrene oxides, of ethylene oxide, propylene oxide, tetrahydrofuran, butylene oxide, epichlorohydrin, as well as their mixed-addition and graft products, as well as the polyether polyols obtained by condensation of polyhydric alcohols or mixtures thereof and those obtained by alkoxylation of polyhydric alcohols, amines and amino alcohols.

Suitable polyether polyols often have a hydroxyl functionality of 1.5 to 6.0, such as 1.8 to 3.0, a hydroxyl number of 20 to 700 mg KOH/g solid, such as 20 to 100, 20 to 50 or, in some cases 20 to 40 mg KOH/g solid, and/or a Mn of 400 to 4000 g/mol, such as 100 to 4000 or 1000 to 3000 g/mol.

Exemplary polyester polyols are the polycondensation products of di- as well as optionally tri- and tetra-ols and di- as well as optionally tri- and tetra-carboxylic acids or hydroxycarboxylic acids or lactones. Instead of the free polycarboxylic acids it is also possible to use the corresponding polycarboxylic acid anhydrides or corresponding polycarboxylic acid esters of lower alcohols to prepare the polyesters. Examples of suitable diols are ethylene glycol, butylene glycol, diethylene glycol, triethylene glycol, polyalkylene glycols such as polyethylene glycol, further 1,2-propanediol, 1,3-propanediol, 1,3-butanediol, 1,4-butanediol, 1,6-hexanediol and isomers, 1,8-octanediol, neopentyl glycol, 1,4-bishydroxymethyl-cyclohexane, 2-methyl-1,3-propanediol, 2,2,4-trimethyl-1,3-pentanediol, dipropylene glycol, polypropylene glycols, dibutylene glycol, polybutylene glycols, bisphenol A, tetrabromobisphenol A, lactone-modified diols, or hydroxypivalic acid neopentyl glycol ester. In order to achieve a functionality >2, polyols having a functionality of 3 can optionally be used proportionately, for example trimethylolpropane, glycerol, erythritol, pentaerythritol, trimethylolbenzene or trishydroxyethyl isocyanurate.

Suitable dicarboxylic acids are, for example, phthalic acid, isophthalic acid, terephthalic acid, tetrahydrophthalic acid, hexahydro-phthalic acid, cyclohexane-dicarboxylic acid, adipic acid, azelaic acid, sebacic acid, glutaric acid, tetrachlorophthalic acid, maleic acid, fumaric acid, itaconic acid, malonic acid, suberic acid, 2-methylsuccinic acid, 3,3-diethylglutaric acid, and/or 2,2-dimethylsuccinic acid. Anhydrides of those acids can likewise be used, where they exist. Thus, for the purposes of the present invention, anhydrides are included in the expression "acid".

Monocarboxylic acids, such as benzoic acid and hexanecarboxylic acid, can also be used, provided that the mean functionality of the polyol is ≥2. Saturated aliphatic or aromatic acids can be used, such as adipic acid or isophthalic acid. Trimellitic acid is a polycarboxylic acid which can also optionally be used.

Hydroxycarboxylic acids which can be used as reactants in the preparation of a polyester polyol having terminal hydroxyl groups are, for example, hydroxycaproic acid, hydroxybutyric acid, hydroxydecanoic acid, hydroxystearic acid and the like. Suitable lactones are, for example, ε-caprolactone, butyrolactone and their homologues.

In certain embodiments of the present invention, polymer polyol (ii) comprises or, in some cases, consists essentially of or consists of a polyester diol that is a reaction product of butanediol and one or more of neopentyl glycol, hexanediol, ethylene glycol, and diethylene glycol with adipic acid and one or more of phthalic acid and isophthalic acid, such as polyester polyols that are a reaction product of at least one of butanediol, neopentyl glycol, and hexanediol with at least one of adipic acid and phthalic acid.

Suitable polyester polyols, such as the foregoing polyester diols, often have a hydroxyl functionality of 1.5 to 6.0, such as 1.8 to 3.0, a hydroxyl number of 20 to 700 mg KOH/gram solid, such as 20 to 100, 20 to 80 or, in some cases 40 to 80 mg KOH/g solid, and/or a $M_n$ of 500 to 3000 g/mol, such as 600 to 2500 g/mol.

Exemplary polycarbonate polyols are obtainable by reaction of carbonic acid derivatives, for example diphenyl carbonate, dimethyl carbonate or phosgene, with diols. Suitable diols include the diols mentioned earlier with respect to the preparation of polyester polyols. In some cases, the diol component contains from 40 wt. % to 100 wt. % 1,6-hexanediol and/or hexanediol derivatives, often containing ether or ester groups in addition to terminal OH groups, for example products which are obtained by reaction of one mole of hexanediol with at least one mole, preferably from one to two moles, of ε-caprolactone or by etherification of hexanediol with itself to form di- or tri-hexylene glycol. Polyether polycarbonate polyols can also be used.

The third component of the polyurethane dispersion (PUD) is a compound comprising at least one isocyanate-reactive group and an anionic group or potentially anionic group (iii). Exemplary such compounds are those which contain, for example, carboxylate, sulfonate, phosphonate groups or groups which can be converted into the above-mentioned groups by salt formation (potentially anionic groups), and which can be incorporated into the macromolecules by isocyanate-reactive groups, such as hydroxyl or amine groups, that are present.

Suitable anionic or potentially anionic compounds are, for example, mono- and di-hydroxycarboxylic acids, mono- and di-aminocarboxylic acids, mono- and di-hydroxysulfonic acids, mono- and di-aminosulfonic acids as well as monoand di-hydroxyphosphonic acids or mono- and di-aminophosphonic acids and their salts, such as dimethylol-propionic acid, dimethylolbutyric acid, hydroxypivalic acid, N-(2-amino-ethyl)-ß-alanine, 2-(2-amino-ethylamino)-ethanesulfonic acid, ethylene-diamine-propyl- or -butyl-sulfonic acid, 1,2- or 1,3-propylenediamine-3-ethylsulfonic acid, malic acid, citric acid, glycolic acid, lactic acid. In certain embodiments, the anionic or potentially anionic compounds have at least one of carboxy, carboxylate, and sulfonate groups and have a functionality of from 1.9 to 2.1, such as the salts of 2-(2-aminoethyl-amino)ethanesulfonic acid.

In certain embodiments, component (iii) is used in an amount of at least 0.1% by weight, such as at least 1%, or at least 3% by weight and/or no more than 10% by weight, such as no more than 7% by weight, based on the total weight of reactants used to make the polyurethane.

Component (v) is a mono functional polyalkylene ether that contains at least one, in some cases one, hydroxy or amino group. In some embodiments, component (vi) comprises compounds of the formula:

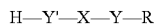

H—Y'—X—Y—R in which R is a monovalent hydrocarbon radical having 1 to 12 carbon atoms, such as an unsubstituted alkyl radical having 1 to 4 carbon atoms; X is a polyalkylene oxide chain having 5 to 90, such as 20 to 70 chain members, which may comprise at least 40%, such as at least 65%, ethylene oxide units and which in addition to ethylene oxide units may comprise propylene oxide, butylene oxide and/or styrene oxide units; and Y and Y' are each independently oxygen or —NR'— in which R' is H or R, in which R is defined above.

Mono functional polyalkylene ethers suitable for use in component (v) may, in some cases, contain 7 to 55 ethylene oxide units per molecule, and can be obtained by alkoxylation of suitable starter molecules, such as, for example, saturated monoalcohols, such as methanol, ethanol, n-propanol, isopropanol, n-butanol, isobutanol, sec-butanol, the isomeric pentanols, hexanols, octanols and nonanols, n-decanol, n-dodecanol, n-tetradecanol, n-hexadecanol, n-octadecanol, cyclohexanol, the isomeric methyl-cyclohexanols or hydroxymethyl-cyclohexane, 3-ethyl-3-hydroxy-methyl-oxetan or tetrahydrofurfuryl alcohol; diethylene glycol monoalkyl ethers, such as, for example, diethylene glycol monobutyl ether; unsaturated alcohols, such as allyl alcohol, 1,1-dimethyl-allyl alcohol or oleic alcohol; aromatic alcohols, such as phenol, the isomeric cresols or methoxyphenols; araliphatic alcohols, such as benzyl alcohol, anis alcohol or cinnamic alcohol; secondary monoamines, such as dimethylamine, diethylamine, dipropylamine, diisopropylamine, dibutyl-amine, bis-(2-ethylhexyl)-amine, N-methyl- and N-ethyl-cyclohexylamine or dicyclohexylamine; as well as heterocyclic secondary amines, such as morpholine, pyrrolidine, piperidine or 1H-pyrazole, including mixtures of two or more of any of the foregoing.

Alkylene oxides suitable for the alkoxylation reaction include, for example, ethylene oxide and propylene oxide, which can be used in the alkoxylation reaction in any desired sequence or alternatively in admixture. In some embodiments, component (v) comprises a copolymer of ethylene oxide with propylene oxide that contains ethylene oxide in an amount of at least 40% by weight, such as at least 50% by weight, at least 60% by weight or at least 65% by weight and/or up to 90% by weight or up to 80% by weight, based on the total weight of ethylene oxide and propylene oxide. In certain embodiments, the $M_n$ of such a copolymer is 300 g/mol to 6000 g/mol, such as 500 g/mol to 4000 g/mol, such as 1000 g/mol to 3000 g/mol.

In certain embodiments, component (v) is used in an amount of at least 1% by weight, such as at least 5%, or at least 10% by weight or no more than 30% by weight, such as no more than 20% by weight, based on the total weight of reactants used to make the polyurethane.

Component (vi) comprises a polyol having a molecular weight of less than <400 grams/mol. Examples of such polyols include, without limitation, the diols mentioned earlier with respect to the preparation of polyester polyols. In some cases, the polyol having a molecular weight of less than <400 g/mol has up to 20 carbon atoms, such as is the case with, for example, ethylene glycol, diethylene glycol, triethylene glycol, 1,2-propanediol, 1,3-propanediol, 1,4-butanediol, 1,3-butylene glycol, cyclohexanediol, 1,4-cyclohexanedimethanol, 1,6-hexanediol, neopentyl glycol, hydroquinone dihydroxyethyl ether, bisphenol A (2,2-bis(4-hydroxyphenyl)propane), hydrogenated bisphenol A, (2,2-bis(4-hydroxycyclohexyl)propane), trimethylolpropane, glycerol, pentaerythritol and also any desired mixtures of two or more thereof. Also suitable are ester diols of the specified molecular weight range such as α-hydroxybutyl-ε-hydroxy-caproic acid ester, ω-hydroxyhexyl-γ-hydroxybutyric acid ester, β-hydroxy-ethyl adipate or bis(β-hydroxyethyl) terephthalate.

In certain embodiments, component (vi) is used in an amount of at least 1% by weight, such as at least 2%, or at least 3% by weight and/or no more than 20% by weight, such as no more than 10% or no more than 5% by weight, based on the total weight of reactants used to make the polyurethane.

Component (vii) is used for chain extension and includes di- or poly-amines as well as hydrazides, for example ethylenediamine, 1,2- and 1,3-diaminopropane, 1,4-diaminobutane, 1,6-diaminohexane, isophorone-diamine, isomer mixture of 2,2,4- and 2,4,4-trimethyl-hexamethylene-diamine, 2-methylpentamethylenediamine, diethylenetriamine, 1,3- and 1,4-xylylenediamine, α,α,α', α'-tetramethyl-1,3- and -1,4-xylylenediamine and 4,4-di-aminodicyclohexylmethane, dimethylethylenediamine, hydrazine or adipic acid dihydrazide. Also suitable for use are compounds which contain active hydrogen of different reactivity towards NCO groups, such as compounds which contain, in addition to a primary amino group, also secondary amino groups or, in addition to an amino group (primary or secondary), also OH groups. Examples thereof are primary/secondary amines, such as 3-amino-1-methyl-aminopropane, 3-amino-1-ethylaminopropane, 3-amino-1-cyclohexylaminopropane, 3-amino-1-methylaminobutane, also alkanolamines such as N-aminoethylethanol-amine, ethanolamine, 3-aminopropanol or neopentanolamine.

In certain embodiments, component (vii) is used in an amount of at least 1% by weight, such as at least 3% or at least 5% by weight and no more than 10% by weight, such as no more than 8% or, in some cases, no more than 7% by weight, based on the total weight of reactants used to make the polyurethane.

Any of a variety of processes can be used to prepare the aqueous polyurethane dispersion (PUD) useful in the present invention, such as the prepolymer mixing method, acetone method or melt dispersing method, each of which will be understood by a person skilled in the art of making aqueous polyurethane dispersions. For example, in some embodiments, the aqueous polyurethane dispersions of the present invention may be produced by the acetone method, such as is described, for example, in U.S. Patent Application Publication No. 2007/0167565 A1 at [0057]-[0073], the cited portion of which being incorporated herein by reference.

In certain embodiments, the resin solids content of the aqueous polyurethane dispersion (PUD) prepared by any of these methods is at least 20% by weight, such as at least 25% or at least 30% by weight or no more than 65% by weight, such as no more than 50% or no more than 45% by weight, based on the total weight of the dispersion.

In various embodiments, the liquid compositions of the invention may optionally include one or more colorants, such as pigments and dyes. Any suitable pigment can be used in the compositions of the present invention. Examples of suitable pigments include inorganic white pigments, inorganic chromatic pigments, iron oxide pigments, oxidic mixed-phase pigments, organic pigments, and inorganic black pigments.

As inorganic white pigments, mention should be made in particular of oxides, such as titanium dioxide, zinc oxide (ZnO, zinc white), zirconium oxide, carbonates such as lead white, sulfates, such as lead sulfate, and sulfides such as zinc sulfide, and lithopones; titanium dioxide is particularly preferred.

As inorganic chromatic pigments, mention should be made of those from the group of oxides and hydroxides in the form of their individual inorganic compounds or mixed phases, especially iron oxide pigments, chromium oxide pigments and oxidic mixed-phase pigments with rutile or spinel structure, and also bismuth vanadate, cadmium, cerium sulfide, chromate, ultramarine and iron blue pigments.

Examples of iron oxide pigments are Color Index Pigment Yellow 42, Pigment Red 101, Pigment Blue 11, Pigment Brown 6, and transparent iron oxide pigments. Examples of chromium oxide pigments are Color Index Pigment Green 17 and Pigment Green 18.

Examples of oxidic mixed-phase pigments are nickel titanium yellow and chromium titanium yellow, cobalt green and cobalt blue, zinc iron brown and chromium iron brown, and also iron manganese black and spinel black.

Examples of preferred organic pigments are those of the monoazo, disazo, laked azo, β-naphthol, Naphiol AS, benzimidazolone, disazo condensation, azo metal complex, isoindoline and isoindolinone series, and also polycyclic pigments such as those from the phthalocyanine, quinacridone, perylene, perinone, thioindigo, anthraquinone, dioxazine, quinophthalone and diketopyrrolopyrrole series. Also suitable are laked dyes such as Ca, Mg and Al lakes of dyes containing sulfonic acid or carboxylic acid groups, and also carbon blacks, which for the purposes of this specification are taken to be pigments and of which a large number are known. Mention should be made in particular of acidic to alkaline carbon blacks obtained by the furnace black process, and also chemically surface-modified carbon blacks, examples being sulfo- or carboxyl-containing carbon blacks.

Examples of inorganic black pigments that should be mentioned include those as already described above together with the inorganic chromatic pigments, especially black iron oxide, spinel black, and black oxidic mixed-phase pigments.

Examples of suitable surfactants for inclusion in the instant invention include, but are not limited to, cationic surfactants, anionic surfactants, and non-ionic surfactants. Examples of anionic surfactants include sulfonates, carboxylates, and phosphates. Examples of cationic surfactants include quaternary amines. Examples of non-ionic surfactants include block copolymers containing ethylene oxide and silicone surfactants.

The liquid sprayable compositions of the present invention can contain the pigment at a level of at least 1%, in some cases at least 2%, in other cases at least 5% by weight, in some situations at least 10% and in other situations at least 15% by weight. The amount of the pigment in the compositions can be any of the values recited above or can range between any of the values recited above.

The compositions of the present invention may be admixed and combined with conventional paint-technology binders, auxiliaries and additives, selected from the group of pigments, dyes, matting agents, flow control additives, wetting additives, slip additives, metallic effect pigments, fillers, nanoparticles, light stabilizing particles, anti-yellowing additives, thickeners, and additives for reducing the surface tension.

In certain embodiments, ceramic microspheres may be added into the liquid composition, up to 15% by weight for the solid microspheres, acting as a protective top layer to further reduce marring and scratching of the solid coating to which it has been incorporated. Additionally, microspheres enhance performance by increasing gloss control, burnish resistance, hardness, corrosion resistance, and abrasion resistance. Microspheres are solid particles, e.g., glass, polymer, ceramic, etc., and are roughly 3 μm to 10 μm in diameter, although particles of a smaller diameter, e.g., nanospheres may be used (interchangeably with microspheres). As the liquid composition dries, microspheres become enriched near the top surface of the solid coating, and form a protective layer within the solid coating.

Although the liquid compositions according to the invention are preferably applied by spraying, they can be applied to the substrate by other conventional techniques, such as, rolling, flooding, printing, knife-coating, pouring, brushing and dipping.

Although primarily intended for use in or as peelable coatings for vehicles, the inventive compositions may also find use in or as automotive OEM delivery wraps, transportation coatings, ride-hailing advertisements; agricultural and mining equipment; in architectural coatings such as floor coatings, bath tub and shower protective peelable coatings; and in home and office furniture protective coverings.

EXAMPLES

The non-limiting and non-exhaustive examples that follow are intended to further describe various non-limiting and non-exhaustive embodiments without restricting the scope of the embodiments described in this specification. All quantities given in "parts" and "percents" are understood to be by weight, unless otherwise indicated.

The following materials were used in preparing the compositions of the Examples:

| | |
|---|---|
| PUD A | a cosolvent free aliphatic, anionic, fatty acid-modified polyurethane dispersion having a solids content of approx. 35 wt. %; |
| PUD B | an aliphatic polyester-polyurethane dispersion that is cosolvent-free, solids content of approx. 40%; |
| PUD C | an anionic dispersion of an aliphatic polyester urethane resin in water having a solids content of approx. 40 wt. %; |
| PUD D | a solvent-free, aliphatic polyurethane resin dispersion having a solids content of approx. 40 wt. %; |
| PUD E | an ionic/non-ionic polycarbonate ester polyurethane dispersion; |
| PUD F | an ionic/anionic polycarbonate ester polyurethane dispersion; |
| PUD G | an anionic, aliphatic, polyether-polyurethane dispersion in water, 50% by weight non-volatile content; |

-continued

| | |
|---|---|
| PUD H | an anionic, aliphatic polyester-polyurethane dispersion; |
| SURFACTANT A | a mixture of hydrophobic solids and foam destroying polysiloxanes in polyglycol, commercially available from BYK Chemie as BYK-028; |
| SURFACTANT B | a solution of a polyether modified siloxane, commercially available from BYK Chemie as BYK-346; |
| SURFACTANT C | a polyether modified polydimethylsiloxane, commercially available from BYK Chemie as BYK-348; |
| SURFACTANT D | a polyether modified polysiloxane surfactant commercially available as TEGO FOAMEX 822 from Evonik; |
| SUFACTANT E | an ethoxylated nonionic surfactant, commercially available from Evonik as DYNOL 607 SURFACTANT; |
| PIGMENT A | carbon black, commercially available from Chromaflo Technologies Corp. as UCD 1507Q; |
| ADDITIVE A | a non-ionic polyurethane-based thickener that is free of emulsifier, alkylphenol ethoxylates and organo-tin compounds, commercially available from Borchers as BORCHIGEL PW 25; |
| ADDITIVE B | propylene glycol dimethyl ether, commercially available from Dow as PROGLYDE DMM; |
| ADDITIVE C | a high performance, very fine-grained polymer-treated precipitated silica, commercially available from Evonik as ACEMATT 3600; |
| ADDITIVE D | an alkylphenol ethoxylated-free and VOC-free, non-ionic polyurethane based thickener, commercially available from Borchers as BORCHI GEL 0621 (50% in butyl carbitol); and |
| COMPARATIVE COATING A | a peelable, air-dry, specialty rubber coating, commercially available from Halo Composites LLC as HALO EFX GANGSTA BLACK having a VOC of 6 lbs/gal; |
| COMPARATIVE COATING B | a peelable, air-dry, specialty rubber coating, commercially available from Plasti Dip International as PLASTIDIP MATTE BLACK having a VOC of 5.13 lbs/gal, and 27% solids; |
| COMPARATIVE COATING C | a peelable, air-dry, specialty rubber coating, commercially available from KP Pigments as PROLine MATTE BLACK, VOC not available; and |
| COMPARATIVE COATING D | a removable automotive paint, utilizing p-chlorobenzotrifluoride (exempt solvent in NAFTA), having a VOC of 1.82 lbs/gal, 16-20% solids, commercially available from Dupli-Color Products Company as DUPLI-COLOR MATTE CARBON BLACK. |

Table I summarizes the formulations used in Examples 1-4:

TABLE I

| Component | Ex. 1 | Ex. 2 | Ex. 3 | Ex. 4 |
|---|---|---|---|---|
| PUD A | | | | 79.01 |
| PUD B | | | 76.9 | |
| PUD C | 91.03 | | | |
| PUD D | | 77.61 | | |
| SURFACTANT A | | | 0.18 | |
| SURFACTANT B | 0.76 | 0.69 | | 0.57 |
| SURFACTANT C | | | 0.09 | |
| SURFACTANT D | 0.93 | 0.75 | | 0.12 |
| WATER, DI | 2.38 | | 13.71 | |
| PIGMENT A | 2.64 | 2.25 | 2.23 | 2 |
| ADDITIVE A | | | | 0.28 |
| ADDITIVE B | | 16.11 | 4.54 | 16.3 |
| ADDITIVE C | 2.26 | 1.93 | 1.91 | 1.72 |
| ADDITIVE D | | 0.65 | 0.44 | |
| NCO:OH | 0 | 0 | 0 | 0 |
| P/B | 0.07 | 0.07 | 0.07 | 0.07 |
| PVC | 4.13 | 4.2 | 4.75 | 4.2 |
| VOC | 0.37 | 2.94 | 1.35 | 3.23 |
| Volume Solids | 36.69 | 30.3 | 27.58 | 26.54 |
| Weight Solids | 40 | 34.21 | 33.59 | 30.29 |
| Wt./Gal | 8.78 | 8.6 | 9.03 | 8.53 |

The components in Tables I and III were made into coatings by adding one-half to one third of the PUD into a mixing vessel, and placing the vessel under mechanical agitation until a rolling donut effect occurred. Each component was added into the batch under agitation; the revolutions per minute (rpm) were increased as needed to maintain a rolling donut. After all ingredients have been added, the components were mixed for 20 minutes. The remainder of the PUD was added mixing was continued for 10 minutes. The resulting coatings were allowed to stand for 24 hours before application using HVLP, Turbine and Aerosol applicators.

TABLE II

| Coating | Ex. 1 | Ex. 2 | Ex. 3 | Ex. 4 | Comp. A | Comp. B | Comp. C | Comp. D |
|---|---|---|---|---|---|---|---|---|
| Appearance: | | | | | | | | |
| DOI (WaveScan by Byk Gardner) | N/A | N/A | N/A | 76.8 | N/A | N/A | N/A | |
| R (WaveScan by Byk Gardner) | N/A | N/A | N/A | 4.5 | N/A | N/A | N/A | |
| Gloss 20° (ASTM D 523) | 7.3 | 0.7 | 4.3 | 2.5 | 27.3 | 0.3 | 0.9 | |
| Gloss 60° (ASTM D 523) | 32.5 | 6.8 | 27.4 | 16.3 | 47.8 | 4.95 | 8.6 | |
| Tensile Properties (ASTM D 412) | | | | | | | | |
| Ultimate Tensile Strength(psi) Ambient cure | 3158.7 | 4852 | 2078.7 | 3086.3 | 2931 | 3536.7 | 2597.7 | |
| Ultimate Elongation (%) Ambient Cure | 524.2 | 405.9 | 115.1 | 153.8 | 191.6 | 554.8 | 501.3 | |
| Strength at 100% Elongation (psi) Ambient Cure | 595.7 | 1420.7 | 1901 | 2607 | 1949.3 | 479.3 | 436.3 | |
| Peel Strength (ASTM D 903) | | | | | | | | |
| Ambient Cure (7 days): (lbf/in) | 1.39 | 2.36 | 0.12 | 0.25 | 1.15 | 0.98 | 0.44 | |
| Pendulum Hardness (ISO 1522) | | | | | | | | |
| Hardness at 7 days(-seconds) | 19.74 | 18.6 | 33.83 | 0.25 | 91.53 | 0.98 | 0.44 | |
| Gasoline Resistance (In house method) | | | | | | | | |
| Rating: | A | B | A | C | E | E | E | |

TABLE III

| Component | Ex. 5 | Ex. 6 | Ex. 7 | Ex. 8 | Ex. 9 | Ex. 10 | Ex. 11 | Ex. 12 |
|---|---|---|---|---|---|---|---|---|
| PUD F | | | | | | | | 89.83 |
| PUD C | | | | | 83.93 | | | |
| PUD A | | | | | | | 90.25 | |
| PUD D | | 92.52 | | | | | | |
| PUD B | | | | | | 83.54 | | |
| PUD E | | | 82.17 | | | | | |
| SURFACTANT B | 0.94 | 0.83 | 0.68 | 0.72 | 0.69 | 0.69 | 0.66 | 0.74 |
| PUD G | | | | 70.33 | | | | |
| SURFACTANT A | | | | | | 0.2 | | |
| SURFACTANT D | 0.94 | 0.89 | 0.58 | 0.9 | 0.86 | | 0.14 | 0.56 |
| PUD H | 72.88 | | | | | | | |
| PIGMENT A | 9.44 | 2.68 | 2.36 | 5.99 | 2.43 | 2.40 | 2.29 | 2.58 |
| ADDITIVE C | 5.45 | 2.30 | 2.70 | 2.18 | 4.18 | 2.75 | 1.96 | 2.95 |
| ADDITIVE A | | | | | | | 0.32 | |
| ADDITIVE B | | | | | 0.99 | | 4.39 | |
| Water, DI | 10.35 | | 11.51 | 19.87 | 6.92 | 9.3 | | 3.34 |
| ADDITIVE D | | 0.78 | | | | | | |
| SURFACTANT E | | | | | | 1.12 | | |
| NCO:OH | 0 | 0 | 0 | 0 | 0 | 0 | 0 | 0 |
| P/B | 0.16 | 0.07 | 0.09 | 0.09 | 0.13 | 0.09 | 0.07 | 0.09 |
| PVC | 9.08 | 4.19 | 5.28 | 0.34 | 7.23 | 5.91 | 4.20 | 5.22 |
| VOC | 0.33 | 0.26 | 0.17 | 0.02 | 0.58 | 0.18 | 1.38 | 0.17 |
| Volume Solids | 46.99 | 37.16 | 32.83 | 89.04 | 35.13 | 32.27 | 30.92 | 36.31 |
| Weight Solids | 52.36 | 40.78 | 36.69 | 39.51 | 38.97 | 38.46 | 34.6 | 40.09 |
| Wt/Gal | 9.26 | 8.85 | 8.85 | 1.49 | 8.83 | 9.18 | 8.7 | 8.87 |

TABLE IV

| Coating | Ex. 5 | Ex. 6 | Ex. 7 | Ex. 8 | Ex. 9 | Ex. 10 | Ex. 11 | Ex. 12 |
|---|---|---|---|---|---|---|---|---|
| Appearance: | | | | | | | | |
| DOI (WaveScan by Byk Gardner) | | | | | | | | |
| R (WaveScan by Byk Gardner) | | | | | | | | |
| Gloss 20° (ASTM D 523) | 1.7 | 1.4 | 2.3 | 6.3 | 1.6 | 2.2 | 3.72 | 5.2 |
| Gloss 60° (ASTM D 523) | 15.9 | 13.1 | 18.5 | 32.5 | 14.4 | 18 | 22.6 | 31.7 |
| Tensile Properties (ASTM D 412) | | | | | | | | |
| Ultimate Tensile Strength(psi) Ambient cure | 1373.9 | 1214.74 | 505.4 | 1575.6 | 1443.6 | 130.86 | 871.74 | 739.08 |
| Ultimate Elongation (%) Ambient Cure | | | | | | | | |
| Strength at 100% Elongation (psi) Ambient Cure | | | | | | | | |
| Peel Strength (ASTM D 903) | | | | | | | | |
| Ambient Cure (7 days): (lbf/in) | 3.27 | 5.26 | 0.61 | 3.17 | 2.10 | 5.43 | n/a | 1.10 |
| Pendulum Hardness (ISO 1522) | | | | | | | | |
| Hardness at 7 days(-seconds) | 35.93 | 28.5 | 26.1 | 33.6 | 24.7 | 39.2 | 97.5 | 34.3 |
| Gasoline Resistance (In house method) | | | | | | | | |
| Rating: | B | B | B | D | A | A | C | B |

Gasoline Resistance Test: A 4 inch×12 inch panel coated with material to be tested was placed at a 70° angle, 2 ounces of gasoline was dispersed at the top side of the panel (4 inch width) and allowed to run down the panel. Gasoline was allowed to evaporate before evaluation. Evaluation of damage to the coating was rated based on the following key.

Gasoline Resistance Rating Key

A—No visible Damage
B—Slight color change

-continued

Gasoline Resistance Rating Key

C—Light staining
D—Heavy Staining
E—Staining with lifting/swelling

Tables V and VI show results of General Motors Test Method GMN 3943 for Five Finger Scratch, with modified ratings.

TABLE V

| Coating | Ex. 1 | Ex. 2 | Ex. 4 | Comp. A | Comp. B | Comp. C | Comp. D |
|---|---|---|---|---|---|---|---|
| Five Finger Scratch: | | | | | | | |
| Rating-18N Finger: | 2 | 3 | 3 | 3 | 3 | 3 | |
| Rating-13N Finger: | 1 | 2 | 2 | 3 | 2 | 2 | |

TABLE V-continued

| Coating | Ex. 1 | Ex. 2 | Ex. 4 | Comp. A | Comp. B | Comp. C | Comp. D |
|---|---|---|---|---|---|---|---|
| Rating-8N Finger: | 1 | 1 | 1 | 2 | 2 | 2 | |
| Rating-3N Finger: | 0 | 0 | 0 | 1 | 1 | 1 | |
| Dry Scratch: | | | | | | | |
| Rating: | 2 | 2 | 5 | 5 | 4 | | |

TABLE VI

| Coating | Ex. 5 | Ex. 6 | Ex. 7 | Ex. 8 | Ex. 9 | Ex. 10 | Ex. 11 | Ex. 12 |
|---|---|---|---|---|---|---|---|---|
| Five Finger Scratch: | | | | | | | | |
| Rating-18N Finger: | 3 | 3 | 3 | 1 | 3 | 3 | 2 | 3 |
| Rating-13N Finger: | 3 | 3 | 3 | 1 | 2 | 2 | 2 | 2 |
| Rating-8N Finger: | 1 | 2 | 3 | 1 | 1 | 2 | 2 | 1 |
| Rating-3N Finger: | 1 | 1 | 1 | 1 | 1 | 1 | 1 | 1 |
| Dry Scratch: | | | | | | | | |
| Rating: | 2 | 2 | 3 | 2 | 2 | 4 | 4 | 3 |

In house Dry Scratch test: 5 double rubs using electronic crockmeter, 1 inch×1 inch pad (SCOTCH BRITE 7447), rated using attached table:

---

Five Finger Rating Key

0—No visible Damage
1—Light Scratch
2—Gouge
3—To Substrate

Dry Scratch Rating Key

1—No Damage
2—Scuffing, barely visible
3—Some unscuffed areas between blended scratches
4—Scratches blend together
5—No undamaged area

---

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth herein. Such embodiments may be obtained, for example, by combining, modifying, or reorganizing any of the disclosed steps, components, elements, features, aspects, characteristics, limitations, and the like, of the various non-limiting embodiments described in this specification. In this manner, Applicant reserves the right to amend the claims during prosecution to add features as variously described in this specification, and such amendments comply with the requirements of 35 U.S.C. § 112(a), and 35 U.S.C. § 132(a).

Various aspects of the subject matter described herein are set out in the following numbered clauses:

1. A homogeneous, sprayable liquid composition formulated for spraying onto a substrate to protectively cover at least a portion of a surface of the substrate, the sprayable liquid composition comprising: (a) an aqueous polyurethane dispersion (PUD); (b) a pigment; (c) a surfactant; and (d) a silica compound, the sprayable liquid composition, once dry, forming a solid, uniform, peelable coating adhered to the substrate without use of a separate adhesive coating layer, the peelable coating having a greater scratch resistance, and the peelable coating having a greater fuel staining resistance compared to peelable, specialty rubber coatings.

2. The composition according to clause 1, wherein the aqueous polyurethane dispersion (PUD) comprises the reaction product of: (i) a polyisocyanate; (ii) a polymeric polyol having a number average molecular weight of 400 to 8,000 g/mol; (iii) a compound comprising at least one isocyanate-reactive group and an anionic group or potentially anionic group; (iv) water; (v) a mono functional polyalkylene ether; (vi) a polyol having a molecular weight of less than <400 g/mol, and (vii) a polyamine or amino alcohol having a molecular weight of 32 to 400 g/mol.

3. The composition according to clause 2, wherein the polyisocyanate (i) is selected from the group consisting of 1,6-hexamethylene diisocyanate (HDI), pentamethylene diisocyanate (PDI), isophorone diisocyanate (IPDI), 2,2,4- and 2,4,4-trimethyl-hexamethylene diisocyanate, isomeric bis-(4,4'-isocyanatocyclohexyl)methanes or mixtures thereof of any desired isomer content, 1,4-cyclohexylene diisocyanate, 1,4-phenylene diisocyanate, 2,4- and 2,6-toluene diisocyanate or hydrogenated 2,4- and 2,6-toluene diisocyanate, 1,5-naphthalene diisocyanate, 2,4'- and 4,4'-diphenylmethane diisocyanate, 1,3- and 1,4-bis-(2-isocyanato-prop-2-yl)-benzene (TMXDI), 1,3-bis(isocyanato-methyl)benzene (XDI), and (S)-alkyl 2,6-diisocyanato-hexanoates or (L)-alkyl 2,6-diisocyanatohexanoates.

4. The composition according to one of clauses 1 to 3, further comprising at least one selected from the group consisting of a UV stabilizer and a UV absorber.

5. The composition according to one of clauses 1 to 4, further comprising nanospheres or microspheres.

6. The composition according to one of clauses 1 to 5, wherein the pigment is selected from the group consisting of inorganic white pigments, inorganic chromatic pigments, iron oxide pigments, oxidic mixed-phase pigments, organic pigments, and inorganic black pigments.

7. The composition according to one of clauses 1 to 6, wherein the pigment is selected from the group consisting of titanium dioxide, zinc oxide (ZnO), zirconium oxide, lead white, lead sulfate, zinc sulfide, and lithopones, titanium dioxide, bismuth vanadate, cadmium, cerium sulfide, chromate, ultramarine iron blue pigments, Color Index Pigment Yellow 42, Pigment Red 101, Pigment Blue 11, Pigment Brown 6, transparent iron oxide pigments, Color Index Pigment Green 17, Pigment Green 18, nickel titanium yellow, chromium titanium yellow, cobalt green, cobalt blue, zinc iron brown, chromium iron brown, iron manganese black, spinel black, carbon black, and black iron oxide.

8. The composition according to one of clauses 1 to 7, wherein the peelable coating is removable over a temperature range of at least 32° F. (0° C.) to 70° F. (21.1° C.).

9. The composition according to one of clauses 1 to 8, wherein the removable protective coating is mechanically peeled by hand.

10. The composition according to one of clauses 1 to 9, wherein the substrate is an exterior surface of a vehicle.

11. The composition according to clause 10, wherein the wherein the vehicle is selected from the group consisting of automobiles, vans, trucks, motorcycles, buses, heavy trucks, trailers, road paving machinery, agricultural equipment, mining equipment, tractors, bulldozers, cranes, combines, graders, locomotives, rail cars, snow mobiles, all-terrain vehicles, wagons, buggies, bicycles, watercraft, and aircraft.

12. The composition according to clause 10, wherein the peelable coating is selected from the group consisting of automotive delivery wraps, transportation coatings, ride-hailing and other advertisements, floor coatings, bath tub protective coatings, shower protective coatings, home furniture protective coverings, and office furniture protective coverings.

13. The composition according to clause 10, wherein the substrate is selected from the group consisting of bath tubs, showers, floors, and furniture.

14. A method of protecting substrate comprising: applying the sprayable liquid composition according to clause 1 for the formation of a removable protective coating on the substrate.

15. The method according to clause 14 further including removing the protective coating over a temperature range of at least 32° F. (0° C.) to 70° F. (21.1° C.).

16. The method according to clause 15, wherein the removing is by mechanically peeling the protective coating by hand.

17. The method according to one of clauses 14 to 16, wherein the substrate is an exterior surface of a vehicle.

18. The method according to clause 17, wherein the wherein the vehicle is selected from the group consisting of automobiles, vans, trucks, motorcycles, buses, heavy trucks, trailers, road paving machinery, agricultural equipment, mining equipment, tractors, bulldozers, cranes, combines, graders, locomotives, rail cars, snow mobiles, all-terrain vehicles, wagons, buggies, bicycles, watercraft, and aircraft.

19. The method according to one of clauses 14 to 16, wherein the substrate is selected from the group consisting of bath tubs, showers, floors, and furniture.

20. The method according to one of clauses 14 to 16, wherein the removable protective coating is selected from the group consisting of automotive delivery wraps, transportation coatings, ride-hailing and other advertisements, floor coatings, bath tub protective coatings, shower protective coatings, home furniture protective coverings, and office furniture protective coverings.

21. An article of manufacture comprising a surface of a substrate coated with the homogeneous, sprayable liquid composition according to one of clauses 1 to 9.

22. The article according to clause 21, wherein the substrate is an exterior surface of a vehicle.

23. The article according to clause 22, wherein the wherein the vehicle is selected from the group consisting of automobiles, vans, trucks, motorcycles, buses, heavy trucks, trailers, road paving machinery, agricultural equipment, mining equipment, tractors, bulldozers, cranes, combines, graders, locomotives, rail cars, snow mobiles, all-terrain vehicles, wagons, buggies, bicycles, watercraft, and aircraft.

24. The article according to clause 21, wherein the substrate is selected from the group consisting of bath tubs, showers, floors, and furniture.

25. The article according to clause 21, wherein the removable protective coating is selected from the group consisting of automotive delivery wraps, transportation coatings, ride-hailing and other advertisements, floor coatings, bath tub protective coatings, shower protective coatings, home furniture protective coverings, and office furniture protective coverings.

What is claimed is:

1. A homogenous, sprayable liquid composition formulated for spraying onto a substrate to protectively cover at least a portion of a surface of the substrate, the sprayable liquid composition comprising:
   (a) an aqueous polyurethane dispersion (PUD) comprising the reaction product of:
      (i) a polyisocyanate;
      (ii) a polymeric polyol having a number average molecular weight of 400 to 8,000 g/mol;
      (iii) a compound comprising at least one isocyanate-reactive group and an anionic group or potentially anionic group wherein the anionic or potentially anionic compounds have at least one of carboxy, carboxylate, and sulfonate groups and have a functionality of from 1.9 to 2.1, and is present in an amount of 0.1 to 10% by weight;
      (iv) water;
      (v) a mono functional polyalkylene ether;
      (vi) a polyol having a molecular weight of less than <400 g/mol, and
      (vii) a polyamine or amino alcohol having a molecular weight of 32 to 400 g/mol;
   (b) a pigment;
   (c) a surfactant;
   (d) a silica compound; and further comprises nanospheres or microspheres,
   the sprayable liquid composition, once dry, forming a solid, uniform, peelable coating adhered to the substrate without use of a separate adhesive coating layer and the peelable coating is removable over a temperature range of at least 32° F. (0° C.) to 70° F. (21.1° C.) or mechanically peeled by hand.

2. The composition according to claim 1, wherein the polyisocyanate (i) is selected from the group consisting of 1,6-hexamethylene diisocyanate (HDI), pentamethylene diisocyanate (PDI), isophorone diisocyanate (IPDI), 2,2,4- and 2,4,4-trimethyl-hexamethylene diisocyanate, isomeric bis-(4,4'-isocyanatocyclohexyl)methanes or mixtures thereof, 1,4-cyclohexylene diisocyanate, 1,4-phenylene diisocyanate, 2, 4- and 2, 6-toluene diisocyanate or hydrogenated 2,4- and 2, 6-toluene diisocyanate, 1,5-napthalene diisocyanate, 2,4'- and 2,6-toluene diisocyanate, 1,5-napthalene diisocyanate, 2,4' and 4,4' diphenylmethane diisocyanate, 1,3- and 1,4 bis(2-isocyanato-prop-2 yl)-benzene (TMXDI), 1,3-bis(isocyanato-methyl)benzene (XDI), and (S)-alkyl 2,6-diisocyanato-hexanoates or (L)-alkyl 2,6 diisocyanato-hexanoates.

3. The composition according to claim 1, wherein the composition further comprises at least one selected from the group consisting of a UV stabilizer and a UV absorber.

4. The composition according to claim 1, wherein the pigment is selected from the group consisting of inorganic white pigments, inorganic chromatic pigments, iron oxide pigments, oxidic mixed-phase pigments, organic pigments, and inorganic black pigments.

5. The composition according to claim 1, wherein the composition according to claim 1, wherein the pigment is selected from the group consisting of titanium dioxide, zinc oxide (ZnO), zirconium oxide, lead white, lead sulfate, zinc sulfide, lithopones, bismuth vanadate, cadmium, cerium sulfide, chromate, ultramarine iron blue pigments, Color Index Pigment Yellow 42, Pigment Red 101, Pigment Blue 11, Pigment Brown 6, transparent iron oxide pigments, Color Index Pigment Green 17, Pigment Green 18, nickel titanium yellow, chromium titanium yellow, cobalt green, cobalt blue, zinc iron brown, chromium iron brown, iron manganese black, spinel black, carbon black, and black iron oxide.

6. The composition according to claim 1, wherein the peelable coating is removable over a temperature range of at least 32° F. (0° C.) to 70° F. (21.1° C.).

7. The composition according to claim 1, wherein the peelable coating is mechanically peeled by hand.

8. The composition according to claim 1, wherein the substrate is an exterior surface of a vehicle.

9. The composition according to claim 8, wherein the vehicle is selected from the group consisting of automobiles, vans, trucks, motorcycles, buses, heavy trucks, trailers, road paving machinery, agricultural equipment, mining equipment, tractors, bulldozers, cranes, combines, graders, locomotives, rail cars, snow mobiles, all-terrain vehicles, wagons, buggies, bicycles, watercraft, and aircraft.

10. The composition according to claim 1, wherein the peelable coating is selected from the group consisting of automotive delivery wraps, transportation coatings, ride-hailing and other advertisements, floor coatings, bath tub protective coatings, shower protective coatings, home furniture protective coverings, and office furniture protective coverings.

* * * * *